US008964725B1

(12) United States Patent
Sylvain (10) Patent No.: US 8,964,725 B1
(45) Date of Patent: Feb. 24, 2015

(54) INITIATING OUTGOING CALLS TO A VOP TERMINAL FROM A POTS-BASED TELEPHONE TERMINAL

(75) Inventor: Dany Sylvain, Gatineau (CA)

(73) Assignee: Rockstar Consortium US LP, Plano, TX (US)

( * ) Notice: Subject to any disclaimer, the term of this patent is extended or adjusted under 35 U.S.C. 154(b) by 2431 days.

(21) Appl. No.: 11/312,613

(22) Filed: Dec. 20, 2005

(51) Int. Cl.
*H04L 12/66* (2006.01)
*H04L 12/58* (2006.01)

(52) U.S. Cl.
USPC ........................................ 370/352; 455/552.1

(58) Field of Classification Search
USPC ................................ 370/352, 230; 455/552.1
See application file for complete search history.

(56) References Cited

U.S. PATENT DOCUMENTS

| | | | | |
|---|---|---|---|---|
| 5,883,948 | A * | 3/1999 | Dunn | 379/221.09 |
| 6,324,280 | B2 * | 11/2001 | Dunn et al. | 379/230 |
| 6,621,893 | B2 * | 9/2003 | Elzur | 379/93.05 |
| 6,714,638 | B1 * | 3/2004 | Kinoshita | 379/221.02 |
| 6,791,973 | B1 * | 9/2004 | Yahiro | 370/352 |
| 6,920,130 | B2 * | 7/2005 | Ramey | 370/352 |
| 7,433,458 | B2 * | 10/2008 | Silver et al. | 379/265.09 |
| 7,512,226 | B1 * | 3/2009 | Yoakum et al. | 379/355.01 |
| 2003/0088619 | A1 * | 5/2003 | Boundy | 709/204 |
| 2003/0125021 | A1 * | 7/2003 | Tell et al. | 455/426 |
| 2004/0131165 | A1 * | 7/2004 | Ebisawa et al. | 379/93.07 |
| 2004/0218583 | A1 * | 11/2004 | Adan et al. | 370/352 |
| 2005/0018651 | A1 * | 1/2005 | Yan et al. | 370/352 |
| 2005/0041792 | A1 * | 2/2005 | Bedingfield, Sr. | 379/211.01 |
| 2005/0174937 | A1 * | 8/2005 | Scoggins et al. | 370/230 |
| 2005/0232243 | A1 * | 10/2005 | Adamczyk et al. | 370/352 |
| 2006/0007915 | A1 * | 1/2006 | Frame | 370/352 |
| 2006/0013195 | A1 * | 1/2006 | Son et al. | 370/352 |
| 2007/0011301 | A1 * | 1/2007 | Ong et al. | 709/224 |
| 2007/0189500 | A1 * | 8/2007 | Stanford | 379/355.01 |

* cited by examiner

*Primary Examiner* — William Deane, Jr.
(74) *Attorney, Agent, or Firm* — Withrow & Terranova, PLLC (57) ABSTRACT

The present invention provides a terminal adaptor and service node, which cooperate to allow a POTS-based telephone terminal to initiate calls to entities having addresses only associated with a packet network. When the telephone terminal initiates a call to the communication terminal, a reference number is provided to the terminal adaptor. The terminal adaptor will initiate a packet session with the communication terminal by sending an initiation message including the reference number to the service node. The service node will use the reference number to identify the corresponding address. With the address, the service node will aid in establishing the packet session between the terminal adaptor and the communication terminal. The terminal adaptor will support a traditional analog connection with the telephone terminal, and provide the requisite interworking between the analog connection and the packet session to support a call between the communication terminal and the telephone terminal.

20 Claims, 6 Drawing Sheets

INITIATING OUTGOING CALLS TO A VOP TERMINAL FROM A POTS-BASED TELEPHONE TERMINAL

FIELD OF THE INVENTION

The present invention relates to telecommunications, and in particular to allowing POTS-based telephones to initiate calls to non-PSTN-based communication terminals.

BACKGROUND OF THE INVENTION

Telephony communications have traditionally been provided by the public switched telephone network (PSTN), which remains dominant in providing telephony services using circuit-switched connections. The PSTN continues to provide the highest quality of service levels for telephony communications and extends to a vast majority of the population. With the ever-increasing availability and quality associated with voice-over-packet (VoP) technologies, there is a movement towards providing telephony communications in association with various types of media services via packet-switched networks.

An increasing number of households and businesses have both PSTN connections through telephony lines, such as plain old telephone system (POTS) lines, as well as broadband access over packet-switched networks to provide access to the Internet, file transfer, streaming media, and the like. Although the PSTN provides a high quality of service, broadband access quality is continuing to increase and has reached a level at which voice communications are of an acceptable quality. As such, VoP communication terminals are capable of establishing a communication session between them over a packet network to support a voice call. These VoP communication terminals are generally associated with packet network addresses and are generally not associated with traditional directory numbers. Establishing calls between PSTN-based telephones and VoP communication terminals is difficult, if not impossible. When such calls are possible, significant interaction between the PSTN and the packet networks is required. Further, since most of the VoP communication terminals do not have PSTN directory numbers, initiating a call from a POTS-based telephone is again difficult, if not impossible.

Accordingly, there is a need for an efficient and cost effective technique to allow a POTS-based telephone to initiate call to a VoP communication terminal. There is a further need to minimize the interworking required between the PSTN and packet networks to facilitate such calls. There is yet a further need to initiate these calls without requiring the VoP terminal to be associated with a directory number.

SUMMARY OF THE INVENTION

The present invention provides a terminal adaptor and service node, which cooperate to allow a POTS-based telephone terminal to initiate calls to entities having addresses only associated with a packet network. The service node will associate an address corresponding to a communication terminal in the packet network with a reference number. When the telephone terminal initiates a call to the communication terminal, the reference number will be provided to the terminal adaptor, preferably as dialed digits. The terminal adaptor will initiate a packet session with the communication terminal by sending an initiation message including the reference number to the service node. The service node will use the reference number to identify the corresponding address. With the address, the service node will aid in establishing the packet session between the terminal adaptor and the communication terminal. The terminal adaptor will support a traditional analog connection with the telephone terminal, and provide the requisite interworking between the analog connection and the packet session to support a call between the communication terminal and the telephone terminal.

The service node may obtain the address for the communication terminal from a prior inbound call intended for the telephone terminal, and create the reference number to associate with the address. The service node can then pass the reference number to the terminal adaptor, which will provide the reference number to the telephone terminal. With the reference number, the telephone terminal can initiate calls to the communication terminal using the reference number. Alternatively, the service node may be provisioned with the reference number and the address for the communication terminal by the user or other entity. Accordingly, the present invention allows a POTS-based telephone terminal to initiate calls to packet-based terminals that are not associated with traditional directory numbers used by the public switched telephone network.

Those skilled in the art will appreciate the scope of the present invention and realize additional aspects thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several aspects of the invention, and together with the description serve to explain the principles of the invention.

DETAILED DESCRIPTION OF THE PREFERRED EMBODIMENTS

The embodiments set forth below represent the necessary information to enable those skilled in the art to practice the invention and illustrate the best mode of practicing the invention. Upon reading the following description in light of the accompanying drawing figures, those skilled in the art will understand the concepts of the invention and will recognize applications of these concepts not particularly addressed herein. It should be understood that these concepts and applications fall within the scope of the disclosure and the accompanying claims.

The present invention provides a technique to allow a POTS-based telephone to easily initiate calls to a Voice-over- Packet (VoP) communication terminal, even when the VoP communication terminal is not associated with a directory number associated with the public switched telephone network (PSTN). Prior to delving into the details of the present invention, an overview of a communication environment according to one embodiment is provided.

Figure 1:
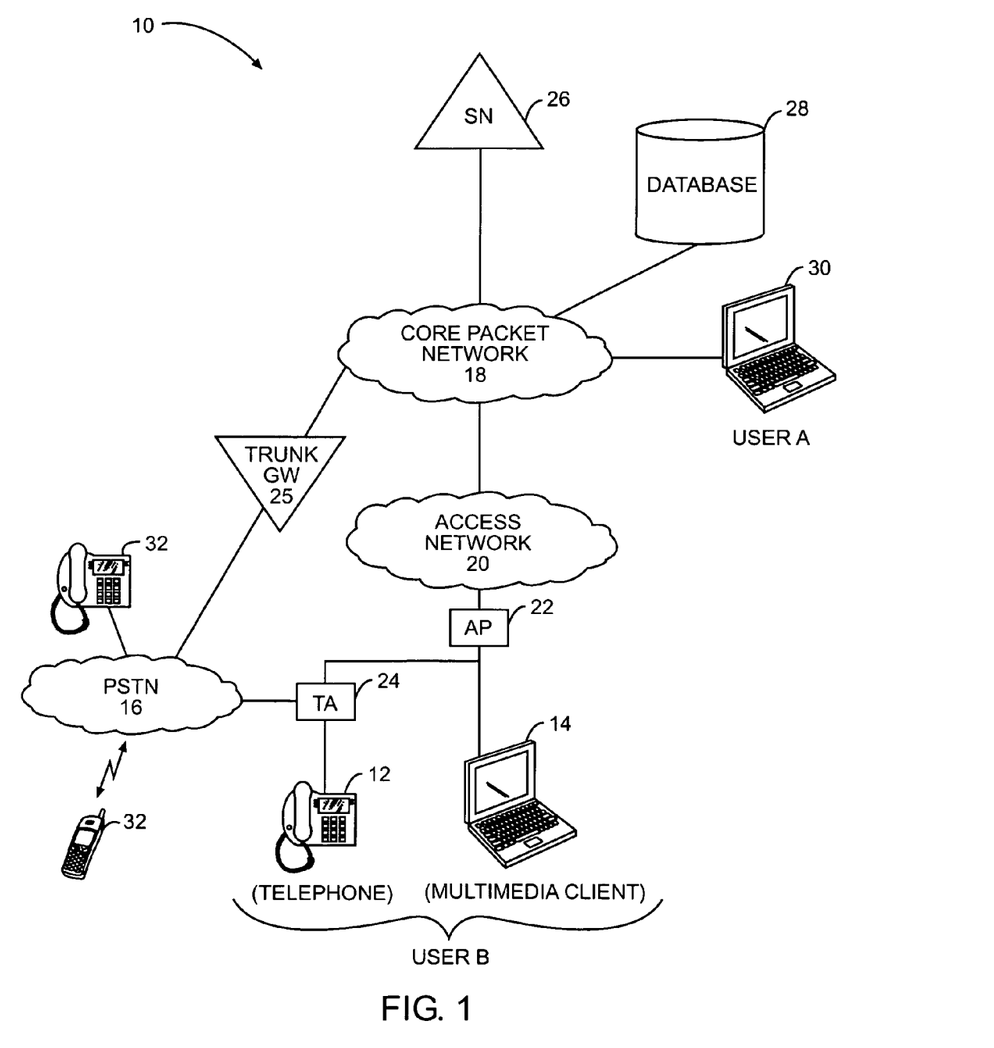
FIG. 1 is a block representation of a communication environment according to one embodiment of the present invention.

With reference to FIG. 1, a communication environment 10 is illustrated wherein a telephone terminal 12 may be associated with a multimedia client 14 and is capable of facilitating telephony communications via a POTS line provided by the PSTN 16. The communication environment 10 also includes a core packet network 18, which is connected to an access network 20, wherein an associated access point (AP) 22 provides a high-speed network connection to the multimedia client 14 as well as to a terminal adaptor (TA) 24.

The terminal adaptor 24 has a POTS interface, a telephone terminal interface, and a network interface. The POTS interface connects to the POTS line leading to the PSTN 16. The telephone terminal interface emulates a POTS line and provides a POTS interface to the telephone terminal 12. The network interface provides a wired or wireless connection directly or indirectly to the access network 20, such as via the access point 22. The terminal adaptor 24 may also be connected directly or indirectly to the multimedia client 14 in a manner wherein direct communications are possible.

The terminal adaptor 24 may be configured in numerous ways. In this embodiment, the terminal adaptor 24 provides the requisite functionality to selectively connect the POTS-based telephone terminal 12 to the PSTN 16 via a POTS line. For a VoP call, the terminal adaptor 24 will provide the necessary processing to support and interwork a VoP connection over the core packet network 18 via the access network 20 and an analog POTS-based connection with the POTS-based telephone terminal 12. Those skilled in the art will recognize the steps necessary to convert between analog-based POTS information to VoP communications. Alternatively, the terminal adaptor 24 may not have a direct PSTN 16 interface but instead rely on a network-based trunk gateway (GW) 25 to place or receive calls from the PSTN 16.

Continuing with FIG. 1, the communication environment 10 may include other entities, such as a service node 26 and a database 28. The service node 26 may assist in establishment and control of communication sessions involving the terminal adaptor 24, multimedia client 14, and other VoP-based communication terminals, such as a multimedia client 30. Further, the service node 26 may act as a proxy for the terminal adaptor 24 and the multimedia client 14. For illustrative purposes only, a User A is associated with multimedia client 30, and a User B is associated with telephone terminal 12, multimedia client 14, and the supporting terminal adaptor 24. For the following communication flows, assume that telephone terminal 12 and multimedia client 14 are associated with a user referenced as User B. With the present invention, the terminal adaptor 24 and service node 26 cooperate to allow multimedia client 30 of User A to initiate calls to the telephone terminal 12 of User B as well as allow the telephone terminal 12 to initiate calls to multimedia client 30. The terminal adaptor 24 will also facilitate inbound and outbound PSTN calls involving wired or wireless terminals, including cellular, PSTN terminals 32 and the telephone terminal 12.

Figure 2:
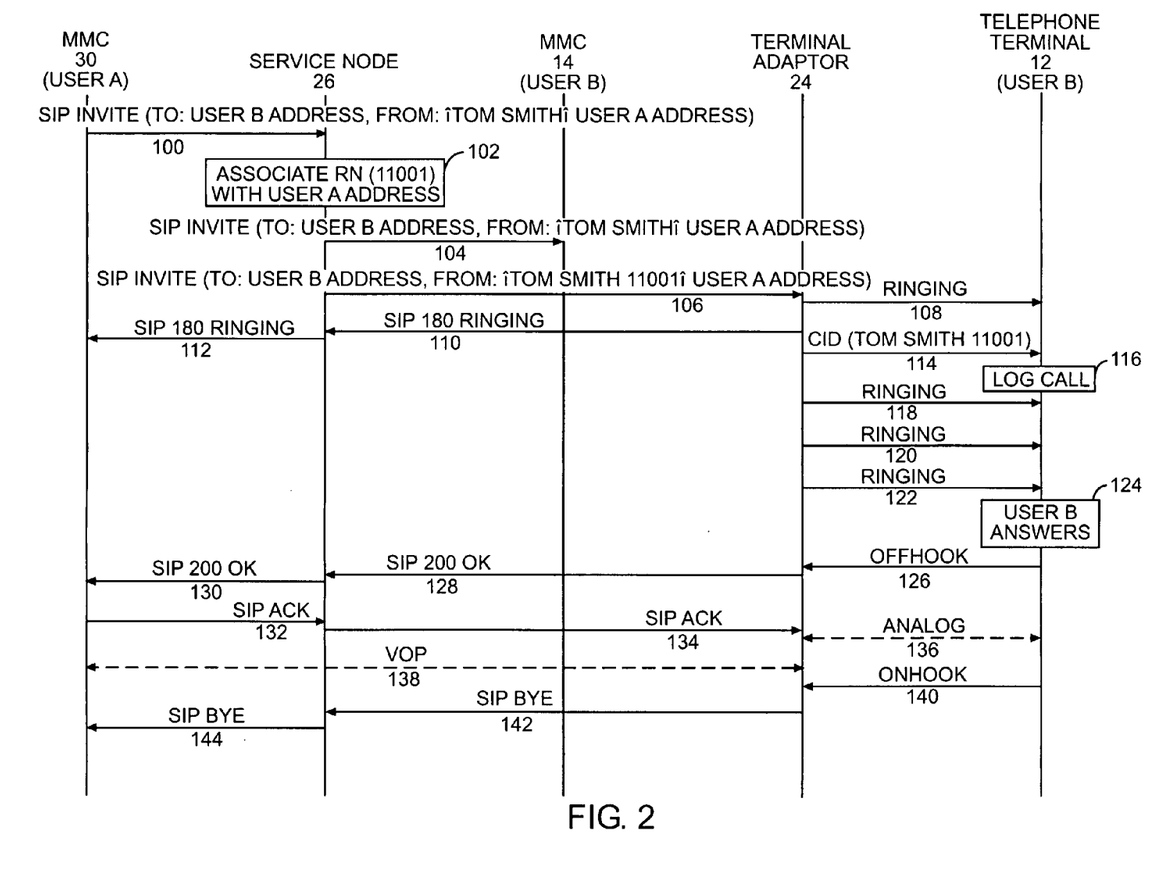
FIG. 2 is a communication flow wherein an inbound call to a POTS-based terminal is provided according to one embodiment of the present invention.

As indicated above, the present invention allows the service node 26 and the terminal adaptor 24 to cooperate in supporting outbound, as well as inbound, calls between a POTS-based telephone 12 and a VoP communication client, such as the multimedia client (MMC) 30. With reference to FIG. 2, a communication flow is provided to illustrate how an incoming call is received by the telephone terminal 12 of User B from the multimedia client 30 of User A via the core packet network 18 and the access network 20. When processing the incoming call, the service node 26 will associate a reference number for the VoP call with an address associated with the multimedia client 30. In this example, the reference number will be 11001, and the address associated with the multimedia client 30 or User A in general, is "User A Address." Further assume that User A's name is Tom Smith. The terminal adaptor 24 will pass the reference number to the telephone terminal 12 as part of the caller identification information. The telephone terminal 12 will then be able to initiate calls back to the multimedia client 30 using the reference number. The communication flow provides further details.

In this communication flow and the following communication flows, the Session Initiation Protocol (SIP) is used for session initiation, control, and establishment between the multimedia client 30 and the terminal adaptor 24 through the core packet network 18 and the access network 20. Those skilled in the art will recognize other session control protocols are equally applicable to the present invention.

Initially, assume multimedia client 30 sends a SIP Invite message towards an address, User B Address, associated with User B (step 100). If the service node 26 is acting as a proxy for User A devices or other session control entity, the SIP Invite message will be directed to the service node 26. The SIP Invite message will identify the originating address as User A Address, and the destination address as User B Address. The SIP Invite message may include caller identification information, such as "Tom Smith." The service node 26 will associate a reference number, 11001, with the origination address, User A Address (step 102). If the multimedia client 14 is used to provide enhanced services in association with incoming or outgoing calls involving User B, the service node 26 may send a SIP Invite message to multimedia client 14 identifying the origination and destination addresses, as well as the caller identification information (step 104), such that multimedia client 14 can log the incoming call or provide information related to the incoming call to the user via an appropriate user interface on the multimedia client 14. For example, the incoming call may trigger a pop up window alerting User B that there is an incoming call from User A.

For the present invention, the service node 26 will send a SIP Invite message to the terminal adaptor 24 (step 106). Notably, the service node 26 will include the reference number in the SIP Invite message. Additionally, the SIP Invite message may associate the caller identification information, "Tom Smith," with the reference number. As illustrated, the SIP Invite message may also identify the origination and destination addresses, User B Address, and User A Address, respectively.

The terminal adaptor 24 will receive the SIP Invite message from the service node 26, retrieve the reference number and any available caller identification information bearing on the identity of User A or the multimedia client 30, and initiate ringing of the telephone terminal 12 (step 108). The terminal adaptor 24 will alert the service node 26 that the telephone terminal 12 is being rung by sending a SIP 180 Ringing message to the service node 26 (step 110), which will forward the SIP 180 Ringing message to the multimedia client 30 (step 112). At this point, the multimedia client 30 is aware that the telephone terminal 12 is ringing.

Having retrieved the caller identification information and the reference number for the incoming call, the terminal adaptor 24 will provide the reference number and any available caller identification information to the telephone terminal 12, as if the information was traditional PSTN caller identification information, between the first and second rings (step 114). The caller identification information originally provided by multimedia client 30 (Tom Smith) is treated as the caller's identity and placed in a caller identity field, wherein the reference number is treated as the caller's directory number and placed in an appropriate field when being delivered to the telephone terminal 12. As such, the telephone terminal 12 can retrieve the original caller identification information and the reference number and log the information in traditional fashion in a call log, such as an incoming call log(step 116). The information associated with the incoming call will later be accessible by User B and can be used to initiate an outbound call to multimedia client 30 or another device associated with User A's address, as described in FIG. 3.

As noted, the caller identification information is delivered between the first and second rings, which are represented by the Ringing signals of steps 108 and 118, respectively. Assume that two other Ringing signals are provided (steps 120 and 122) prior to User B answering the telephone terminal 12 (step 124). When answered, telephone terminal 12 will go Offhook, which will be recognized by the terminal adaptor 24 (step 126). In response, the terminal adaptor 24 will send a SIP 200 OK message to the service node 26 (step 128), which will forward the SIP 200 OK message to the multimedia client 30 (step 130). In response, a SIP Acknowledgement (ACK) message is provided from multimedia client 30 to the service node 26 (step 132), which will forward a SIP Acknowledgement message to the terminal adaptor 24 (step 134).

During the exchange of SIP messages, including the Invite, 200 OK, and perhaps Acknowledgement messages, the requisite information to establish a packet-based communication session between multimedia client 30 and the terminal adaptor 24 is provided. As such, the terminal adaptor 24 will establish a POTS-based analog connection with the telephone terminal 12 (step 136) and a VoP session with multimedia client 30 (step 138) to establish the call. The terminal adaptor 24 will provide the requisite interworking between the digital and analog domains to allow bidirectional voice communications. If the call is ended by User B, telephone terminal 12 will go Onhook, which will be recognized by the terminal adaptor 24 (step 140). The terminal adaptor 24 will send a SIP Bye message to the service node 26 (step 142), which will then send a SIP Bye message to the multimedia client 30 (step 144), wherein the VoP session and the analog connection are ended.

Figure 3:
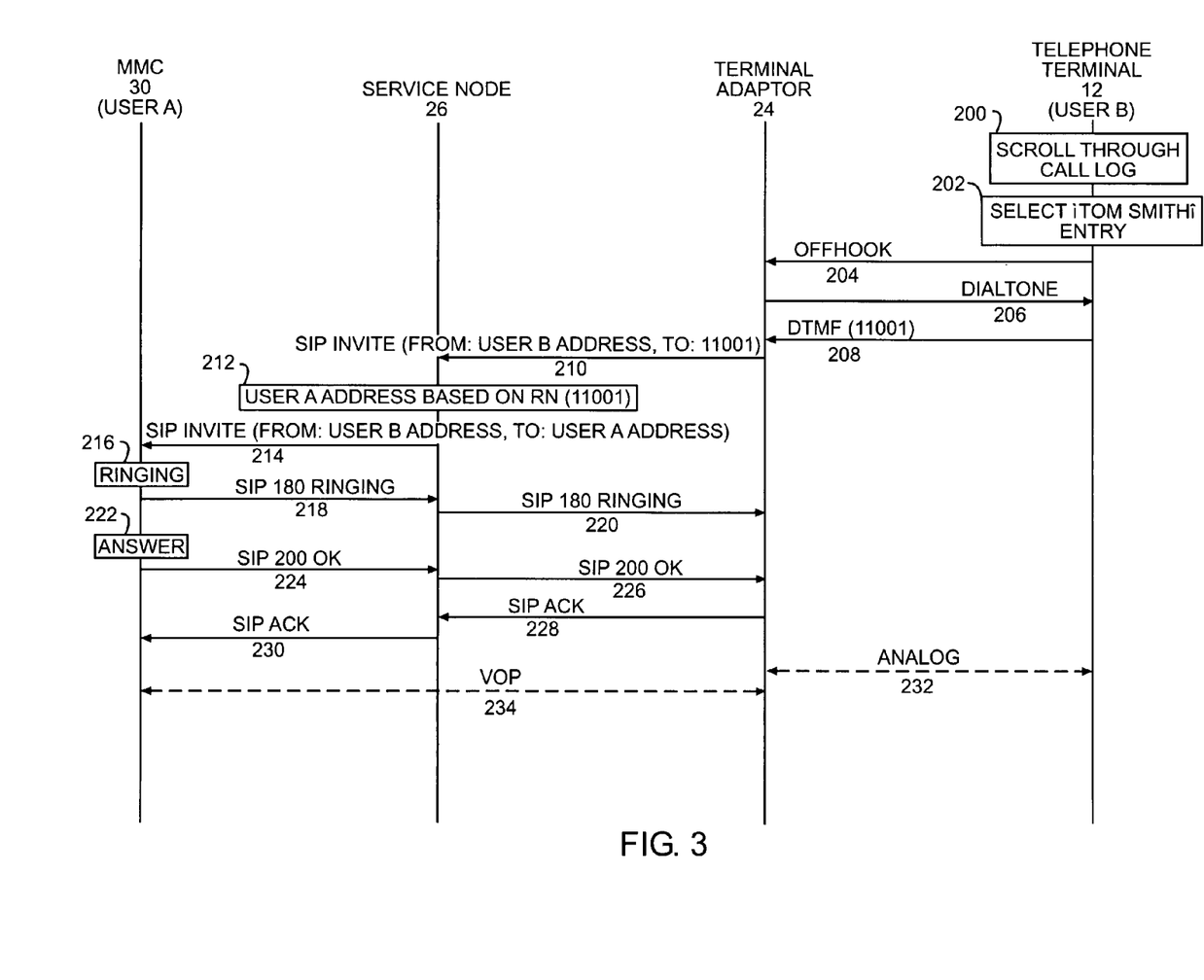
FIG. 3 is a communication flow wherein an outbound call is initiated from a POTS-based terminal according to a first embodiment of the present invention.

With reference to FIG. 3, a communication flow is illustrated wherein the call log generated from the incoming call described in FIG. 2 is used to initiate an outbound call to multimedia client 30 of User A from the telephone terminal 12 of User B. Initially, assume User B scrolls through the call log maintained by the telephone terminal 12 (step 200), and selects the entry associated with Tom Smith (step 202). The telephone terminal 12 will go Offhook (step 204), which will cause the terminal adaptor 24 to provide a dial tone to the telephone terminal 12 (step 206). The telephone terminal 12 will then dial as dual tone multi-frequency (DTMF) digits the reference number associated with Tom Smith (11001) to the terminal adaptor 24 (step 208).

In one embodiment, the terminal adaptor 24 is aware of a dial plan, which allows the terminal adaptor 24 to recognize dialed numbers corresponding to reference numbers, which should trigger initiation of a VoP session over the core packet network 18 via the access network 20. In this example, assume that any dialed numbers starting with consecutive ones will trigger a VoP session initiation. As such, the terminal adaptor 24 will send a SIP Invite to the service node 26 using the reference number (11001) as the destination address, and User B Address as the origination address (step 210). The service node 26 will retrieve an appropriate address, User A Address, to use for establishing a VoP session for the call based on the reference number (step 212), and then send a SIP Invite message to multimedia client 30 using the address User A Address (step 214). The SIP Invite message will identify the origination address as User B Address.

Upon receiving the SIP Invite message, multimedia client 30 will provide a Ringing signal or other incoming call alert to User A (step 216) and send a SIP 180 Ringing message back to the service node 26 (step 218), which will send a SIP 180 Ringing message to the terminal adaptor 24 (step 220). The terminal adaptor 24 may provide an indication to the telephone terminal 12 that multimedia client 30 is ringing (not shown). When multimedia client 30 is answered by User A (step 222), a SIP 200 OK message is sent to the service node 26 (step 224), which will send a SIP 200 OK message to the terminal adaptor 24 (step 226). The terminal adaptor 24 will respond by sending a SIP Acknowledgement message to the service node 26 (step 228), which will send a SIP Acknowledgement message to multimedia client 30 (step 230). Again, the exchange of SIP messages provides sufficient information for multimedia client 30 and the terminal adaptor 24 to establish a VoP session. As such, the terminal adaptor 24 will establish an analog connection with the telephone terminal 12 (step 232) and a VoP session with multimedia client 30 (step 234). The terminal adaptor 24 will provide the requisite interworking between the VoP session and the analog connection to support the call between the telephone terminal 12 and the multimedia client 30. Alternatively, the association of the reference number RN with the user A address may be done in the terminal adaptor 24. As such, the assignment and subsequent association of the reference number could be done in the terminal adaptor 24 instead of the service node 26. The terminal adaptor 24 would essentially add the functionality of the service node 26.

The reference number associated with the address of User A may be established in a variety of ways, and does not need to be created by the service node 26. In the communication flow illustrated in FIG. 4, User B uses multimedia client 14 to provide sufficient information to the service node 26 to associate a reference number with User A's address, User A Address. Accordingly, multimedia client 14 may send instructions to the service node 26 to associate information associated with User A with a reference number. As illustrated, a reference number 12 originating with User B is associated with User A Address, and perhaps party identification information, such as Tom Smith (step 300).

Figure 4:
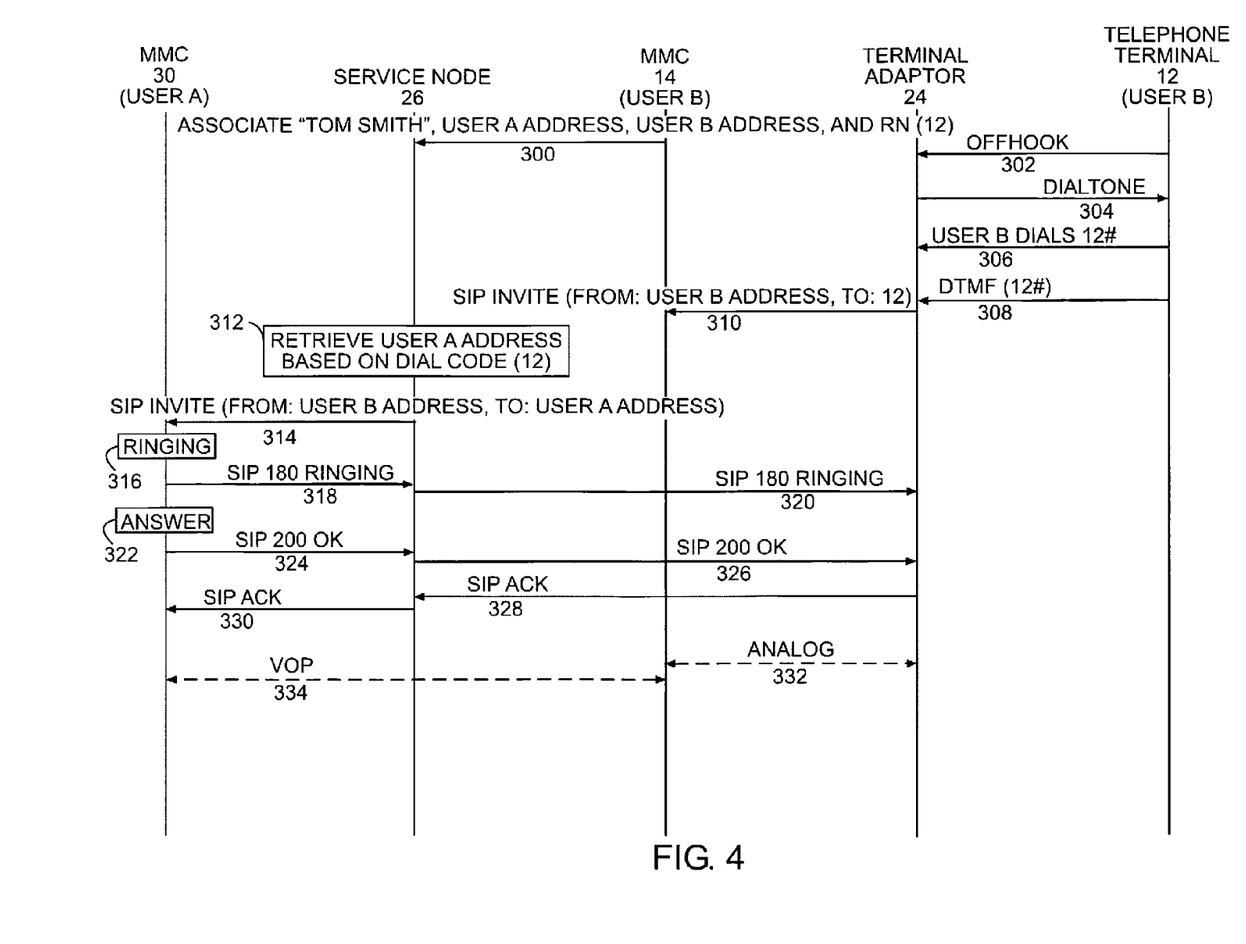
FIG. 4 is a communication flow wherein an outbound call is initiated from a POTS-based terminal according to a second embodiment of the present invention.

Assume that User B takes the telephone terminal 12 Offhook (step 302), and the terminal adaptor 24 detects the Offhook condition and provides a dial tone to the telephone terminal 12 (step 304). User B will dial the reference number followed by a pound sign (#) (step 306). Assume the dialing plan for the terminal adaptor 24 recognizes that any two-digit number followed by a pound sign will require initiation of a VoP session. As such, the telephone terminal 12 delivers the reference number, 12#, in a DTMF format to the terminal adaptor 24 (step 308), which will respond by sending a SIP Invite message to the service node 26 to initiate the VoP session (step 310). The SIP Invite message will include the reference number as the destination address, and the address User B Address as the origination address. The service node 26 will obtain the reference number from the destination field of the SIP Invite message and use the reference number to retrieve the address for User A, User A Address (step 312). The service node 26 will then send a SIP Invite message to multimedia client 30 to establish a VoP session between the terminal adaptor 24 and multimedia client 30 (step 314). The SIP Invite message will identify the origination address as User B Address and the destination address as User A Address.

Upon receiving the SIP Invite message, multimedia client 30 will initiate ringing or provide some other incoming call alert (step 316), and send a SIP 180 Ringing message back to the service node 26 (step 318). The service node 26 will send the SIP 180 Ringing message to the terminal adaptor 24 (step 320), which may provide a ringing indication to the telephone terminal 12 (not shown). When multimedia client 30 is answered (step 322), multimedia client 30 will send a SIP 200 OK message to the service node 26 (step 324), which will send a SIP 200 OK message to the terminal adaptor 24 (step 326). The terminal adaptor 24 will respond by sending a SIP Acknowledgement message to the service node 26 (step 328), which will send a SIP Acknowledgement message to multimedia client 30 (step 330). Again, the exchange of SIP messages provides multimedia client 30 and the terminal adaptor 24 with sufficient information to establish a VoP session therebetween. Accordingly, the terminal adaptor 24 will establish an analog connection with the telephone terminal 12 (step 332), establish a VoP session with multimedia client 30 (step 334), and provide the requisite interworking between the analog connection and the VoP session to support the call between the telephone terminal 12 and multimedia client 30.

As illustrated above, the service node 26 and the terminal adaptor 24 are able to use a reference number dialed by a traditional POTS-based telephone terminal 12 to initiate a call to a VoP communication terminal over a packet-based communication session. The terminal adaptor 24 will recognize a reference number dialed by the telephone terminal 12 and send the reference number to the service node 26 in association with initiating a packet-based communication session with multimedia client 30. The service node 26 will use the reference number to obtain an address or other connection information necessary to establish the packet-based communication session with an entity associated with User A. The service node 26 may generate the reference number while handling a call directed to the telephone terminal 12, wherein the reference number is passed to the telephone terminal 12 by the terminal adaptor 24. Alternatively, the service node 26 may be provisioned with or otherwise provided a reference number in association with a particular packet-based address.

Figure 5:
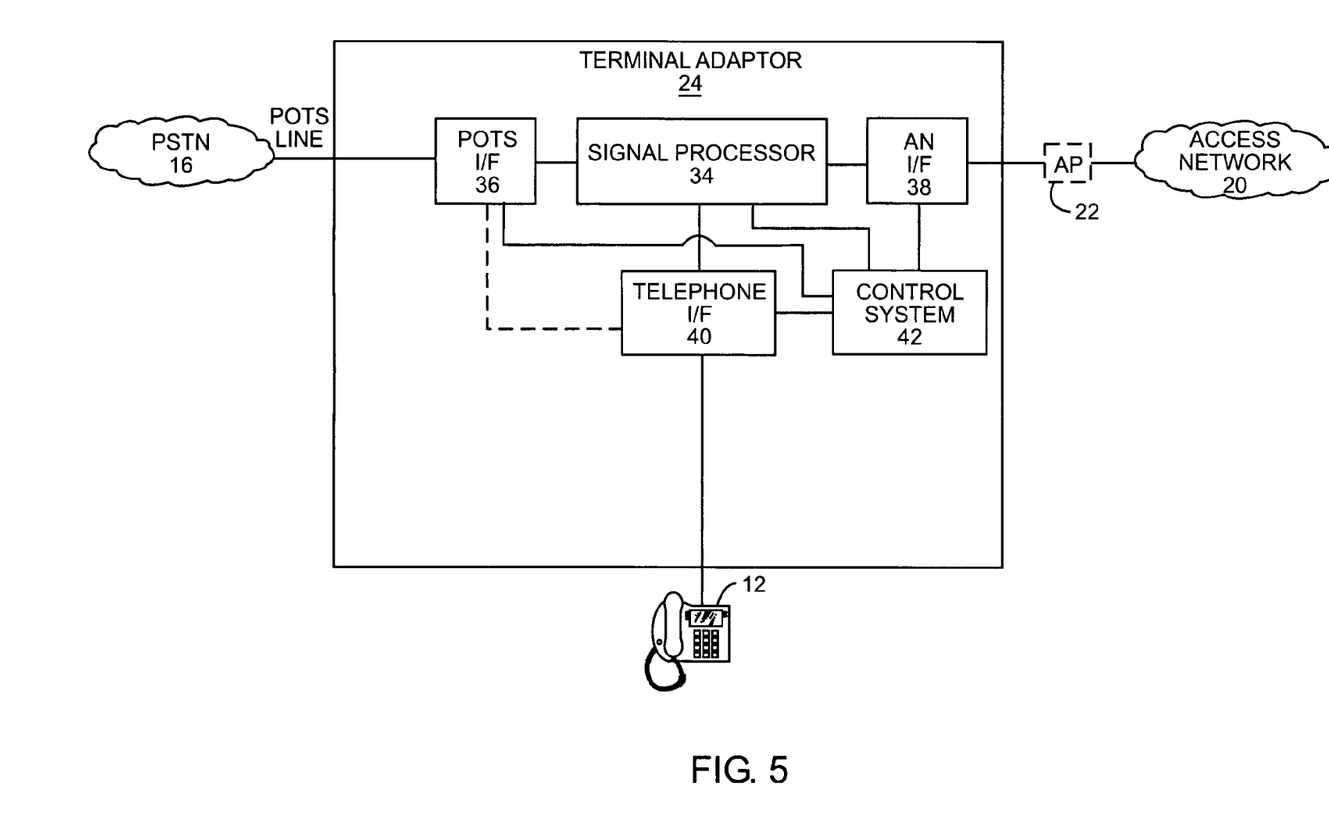
FIG. 5 is a block representation of a terminal adaptor according to one embodiment of the present invention.

With reference to FIG. 5, a block representation of a terminal adaptor 24 is provided. In addition to a signal processor 34, the terminal adaptor 24 will include a POTS interface (I/F) 36, an access network (AN) interface 38, and a telephone interface 40. The POTS interface 36 provides an analog interface to connect to a POTS line provided by the PSTN 16. The access network interface 38 provides a packet connection through wired or wireless means directly to the access network 20 or indirectly to the access network 20 through an access point 22. The telephone interface 40 emulates the POTS line provided by the PSTN 16 to interface with one or more telephone terminals 12. In essence, the telephone interface 40 appears to be a POTS line to a connected telephone terminal 12. The signal processor 34 may provide the requisite conversion between analog-to-digital and digital-to-analog, in light of the necessary packet protocols, to provide interworking between the POTS interface 36 and the access network interface 38, which will be appreciated by those skilled in the art. Further, the POTS interface 36 and the telephone interface 40 may be directly connected to one another or connected indirectly via the signal processor 34.

Control information from the multimedia client 14 and the service node 26 may be received via the access network interface 38. The signal processor 34 may process incoming calls from the POTS line and provide them to the telephone interface 40, as well as receive the analog information from the telephone terminal 12 via the telephone interface 40 and replicate the information at the POTS interface 36, and vice versa. As such, processing may be provided in the digital domain, even when a call is established with the telephone terminal 12 via the POTS line. Alternatively, a direct analog connection (dashed line) can be provided between the POTS interface 36 and the telephone interface 40. A control system 42 may be associated with each of the interfaces, as well as the signal processor 34, to provide the functionality described above.

Figure 6:
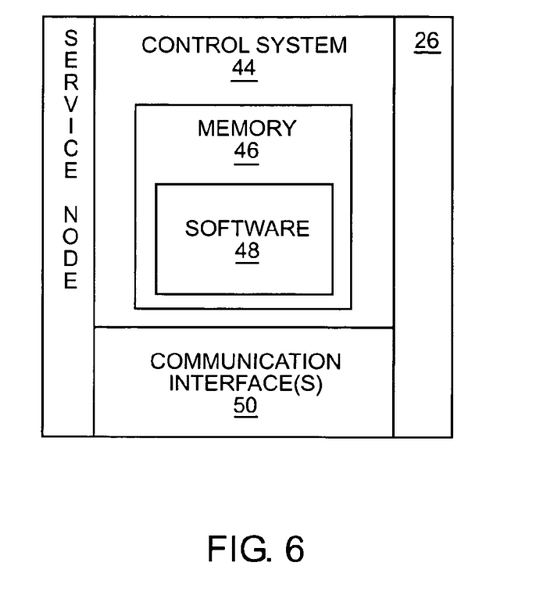
FIG. 6 is a block representation of a service node according to one embodiment of the present invention.

With reference to FIG. 6, a block representation of a service node 26 is provided. The service node 26 may include a control system 44 having sufficient memory 46 for the requisite software 48 to operate as described above. The control system 42 may include one or more communication interfaces 50 to facilitate communications with the various entities associated with the core packet network 18, and directly or indirectly with other entities illustrated in FIG. 1.

Those skilled in the art will recognize improvements and modifications to the preferred embodiments of the present invention. All such improvements and modifications are considered within the scope of the concepts disclosed herein and the claims that follow.

What is claimed is:

1. A method for allowing a plain old telephone system, POTS, telephone terminal to initiate calls to addresses associated with a packet network, the method comprising:
   receiving a non-traditional directory number from a terminal adaptor, which provides a POTS line connection to a telephone terminal, when the telephone terminal initiates a call to a called party using the non-traditional directory number;
   retrieving a previously stored address for a communication terminal on the packet network corresponding to the non-traditional directory number, wherein the address for the communication terminal is a separate non-traditional directory number; and
   effecting establishment of a packet session between the terminal adaptor and the communication terminal using the address, wherein the call is supported by the terminal adaptor connecting the packet session with the communication terminal and the POTS line connection with the telephone terminal.

2. The method of claim 1 wherein the non-traditional directory number is received in a session initiation message from the terminal adaptor.

3. The method of claim 2 wherein the session initiation message provides the non-traditional directory number in a destination field.

4. The method of claim 2 wherein effecting establishment of the packet session further comprises sending the session initiation message toward the communication terminal, the session initiation message including the address in a destination field.

5. The method of claim 1 further comprising associating the non-traditional directory number with the address for the communication terminal on the packet network.

6. The method of claim 5 further comprising receiving information relating the non-traditional directory number and the address from a user associated with the telephone terminal.

7. The method of claim 5 further comprising:
receiving inbound call information associated with establishing a prior call from the communication terminal to the telephone terminal via the terminal adaptor and over the packet network, the inbound call information comprising the address; and
generating the non-traditional directory number to associate with the address.

8. The method of claim 7 further comprising effecting initiation of a prior packet session between the terminal adaptor and the communication terminal for the prior call.

9. The method of claim 7 further comprising sending the non-traditional directory number to the terminal adaptor for delivery to the telephone terminal.

10. The method of claim 9 wherein the non-traditional directory number is sent to the telephone terminal as part of caller identification information delivered to the telephone terminal in association with receiving an indication of an incoming call.

11. An apparatus comprising:
a packet network interface adapted to facilitate packet communications;
a telephone terminal interface adapted to support a POTS-based telephone terminal; and
a control system associated with the telephone terminal interface and the packet network interface and adapted to:
receive a non-traditional directory number provided by the telephone terminal to initiate a call to a communication terminal on a packet network;
send a session initiation message comprising the non-traditional directory number over the packet network to initiate a packet session for the call, wherein the session initiation message is sent to a service node, which retrieves a previously stored address for the communication terminal corresponding to the non-traditional directory number where the address for the communication terminal is a separate non-traditional directory number;
establish an analog connection with the telephone terminal;
establish a packet session with the communication terminal; and
connect the packet session and the analog connection to support the call between the communication terminal and the telephone terminal.

12. The apparatus of claim 11 wherein the service node uses the address to facilitate establishment of the packet session between the communication terminal and the packet network interface.

13. The apparatus of claim 12 wherein the control system is further adapted to:
receive the non-traditional directory number in association with establishing a prior call from the communication terminal to the telephone terminal; and
send the non-traditional directory number to the telephone terminal in association with the prior call.

14. The apparatus of claim 13 wherein the non-traditional directory number is sent to the telephone terminal as part of caller identification information delivered to the telephone terminal in association with providing an indication of the prior call.

15. The apparatus of claim 14 wherein the control system is adapted to send at least two ring signals to the telephone terminal and send the caller identification information to the telephony terminal between first and second ring signals.

16. The apparatus of claim 13 further comprising a POTS line interface and wherein the control system is further adapted to facilitate a POTS call by establishing an analog connection with the telephone terminal and a POTS line connection through a public switched telephone network.

17. The apparatus of claim 11 wherein the non-traditional directory number is at least part of a sequence of dual tone multiple frequency digits received from the telephone terminal in association with initiating the call.

18. The apparatus of claim 17 wherein the control system is further adapted to determine that the call being initiated requires establishment of the packet session based on at least one of the digits within the sequence of dual tone multiple frequency digits.

19. An apparatus for allowing a POTS telephone terminal to initiate calls to addresses associated with a packet network, the apparatus comprising:
a communication interface adapted to facilitate communications over the packet network; and
a control system associated with the communication interface and adapted to:
receive a non-traditional directory number from a terminal adaptor, which provides a POTS line connection to a telephone terminal, when the telephone terminal initiates a call to a called party using the non-traditional directory number;
retrieve a previously stored address for a communication terminal on the packet network corresponding to the non-traditional directory number, wherein the address for the communication terminal is a separate non-traditional directory number; and
effect establishment of a packet session between the terminal adaptor and the communication terminal using the address, wherein the call is supported by the terminal adaptor connecting the packet session with the communication terminal and the POTS line connection with the telephone terminal.

20. The apparatus of claim 19 wherein the non-traditional directory number is received in a session initiation message from the terminal adaptor, the session initiation message associated with establishment of the call.

* * * * *